United States Patent
Fu

(10) Patent No.: US 6,230,772 B1
(45) Date of Patent: May 15, 2001

(54) STRUCTURE OF AN ANTI-SKID DEVICE FOR VEHICLE TIRES

(76) Inventor: Yang-Chen Fu, P.O. Box 82-144, Taipei (TW)

(*) Notice: Subject to any disclaimer, the term of this patent is extended or adjusted under 35 U.S.C. 154(b) by 0 days.

(21) Appl. No.: 09/409,104

(22) Filed: Sep. 30, 1999

(51) Int. Cl.$^7$ .................................................... B60C 11/00
(52) U.S. Cl. ......................... 152/172; 152/219; 152/222
(58) Field of Search ................................. 152/171, 172, 152/213 R, 217, 219, 221, 222

(56) References Cited

U.S. PATENT DOCUMENTS

| | | | |
|---|---|---|---|
| 4,346,748 | * 8/1982 | Bagoy et al. | 152/222 |
| 5,267,596 | * 12/1993 | Logar et al. | 152/221 |
| 5,776,271 | * 7/1998 | Sakuma et al. | 152/213 R |

* cited by examiner

Primary Examiner—Russell D. Stormer
(74) Attorney, Agent, or Firm—A & J

(57) ABSTRACT

An anti-skid device for vehicle tires includes a plurality of flexible net treads connected together by linking rings each of the net treads being provided with a net pattern at an intermediate portion and two pairs of slant arms, an upper portion of each of the net treads having a transverse grip which is shorter than width of a tire, anti-skip members being provided on appropriate positions of the net treads so as to further increase anti-skid ability of the anti-skid body, side arms mounted between outer ends of the slant arms, end arms connected with inner ends of the slant arm, and linking members connecting the end arms to the net treads, the slant arms extending outwardly from the transverse grip, distance between the slant arms being equal to the largest width of the anti-skid body.

1 Claim, 7 Drawing Sheets

STRUCTURE OF AN ANTI-SKID DEVICE FOR VEHICLE TIRES

BACKGROUND OF THE INVENTION

1. Field of the Invention

This invention is related to an improvement in the structure of an anti-skid device for vehicle tires and in particular to one which can be rapidly and securely attached to a vehicle tire.

2. Description of the Prior Art

An anti-skid device must be used on vehicle tires in order to drive on a roadway during inclement weather conditions. However, it has been found that installing and removing conventional anti-skid devices from vehicle tires in inclement weather conditions can be dangerous and difficult. The conventional anti-skid device includes two side arms and a plurality of nets arranged between the two side arms which are generally made from resin or synthetic rubber. The nets are transversely connected together by means of linking rings. However, when in use, the tire must be first lifted by a jack in order to place the anti-skid device under the tire and then the tire is lowered after mounting the anti-skid device. Alternatively, the anti-skid device is first placed on the ground, the vehicle is driven forward or rearward to position the tire on the anti-skid device, and then thereafter the anti-skid device is moved upwardly to enclose the tire. Nevertheless, such operations are very tiresome, especially in winters, thereby making the conventional anti-skid devices unfit for practical use.

Therefore, it is an object of the present invention to provide an improvement in the structure of an anti-skid device for vehicle tires which can obviate and mitigate the above-mentioned drawbacks.

SUMMARY OF THE INVENTION

This invention is related to an improvement in the structure of an anti-skid device for vehicle tires.

It is the primary object of the present invention to provide an improvement in the structure of an anti-skid device for vehicle tires which can be easily and securely mounted on a vehicle tire without using a jack or moving the vehicle.

According to a preferred embodiment of the present invention, an anti-skid device for vehicle tires includes a plurality of flexible net treads connected together by linking rings each of the net treads being provided with a net pattern at an intermediate portion and two pairs of slant arms, an upper portion of each of the net treads having a transverse grip which is shorter than width of a tire, anti-skip members being provided on appropriate positions of the net treads so as to further increase anti-skid ability of the anti-skid body, side arms mounted between outer ends of the slant arms, end arms connected with inner ends of the slant arm, and linking members connecting the end arms to the net treads, the slant arms extending outwardly from the transverse grip, distance between the slant arms being equal to the largest width of the anti-skid body.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
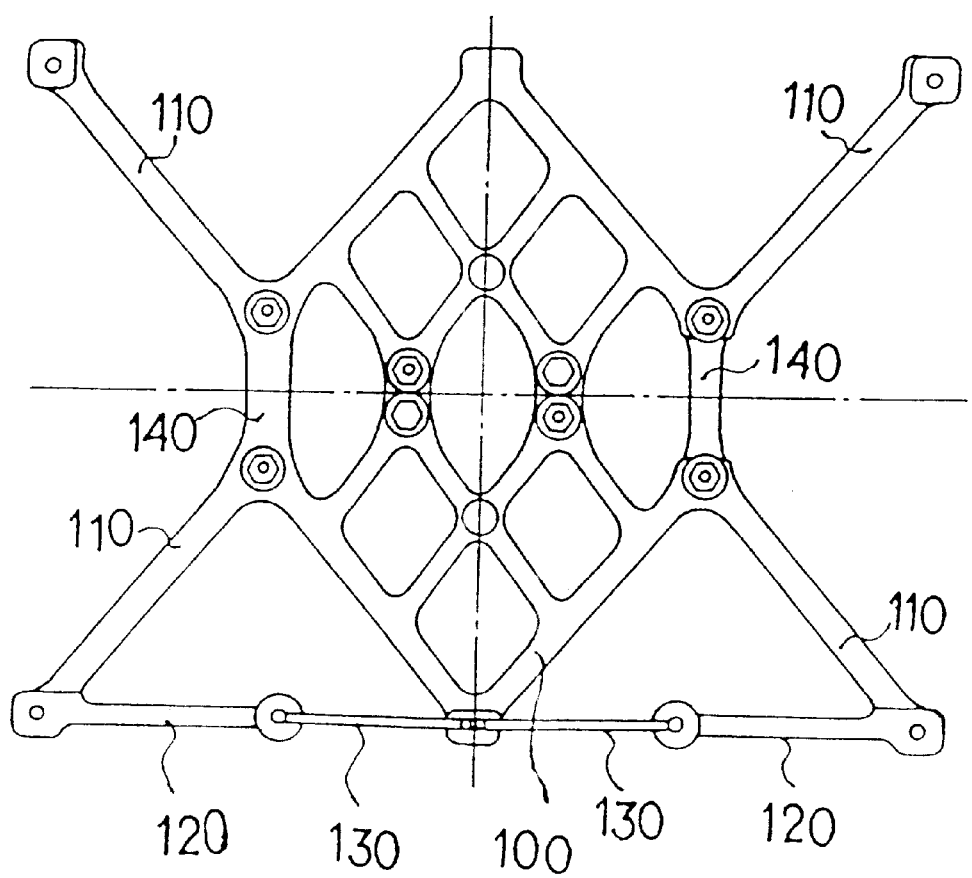
FIG. 1 illustrates the way and means to solve the problem.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to FIG. 1, the present invention comprises a net pattern 100 at the central portion which is provided with two transverse grips 140 at two opposite sides thereof and two pairs of slant arms 110 extending outwardly from the two transverse grips 140. The outer side of the present invention may be tightened by a rubber band (not shown), while the inner side of the present invention is connected by the slant arms 110, the net pattern 100, the end arms 120, and the linking members 130. The end arms 120 may be replaced with ropes as required.

Figure 2:
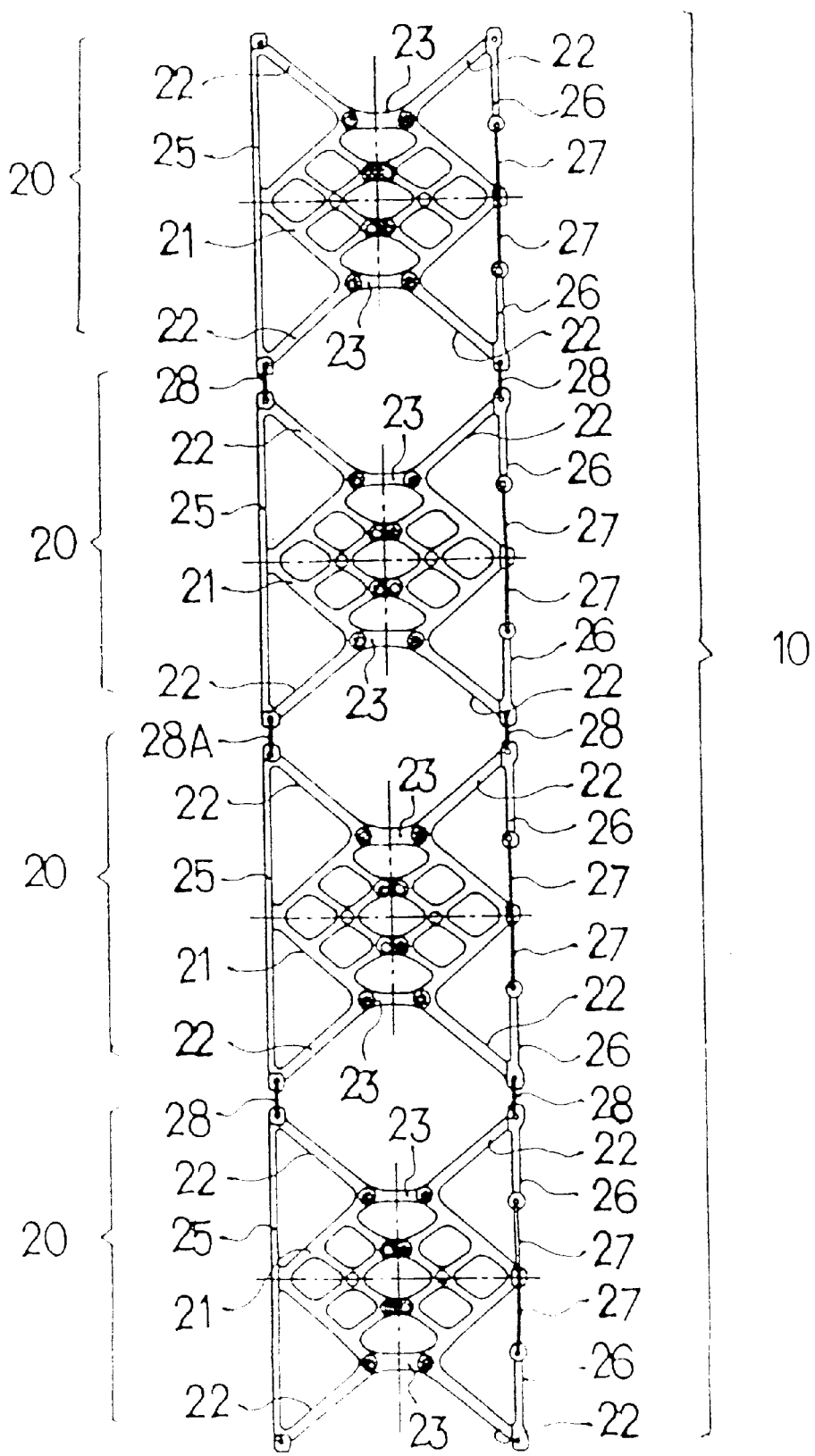
FIG. 2 illustrates an anti-skid device for vehicle tires according to a preferred embodiment of the present invention.
Figure 3:
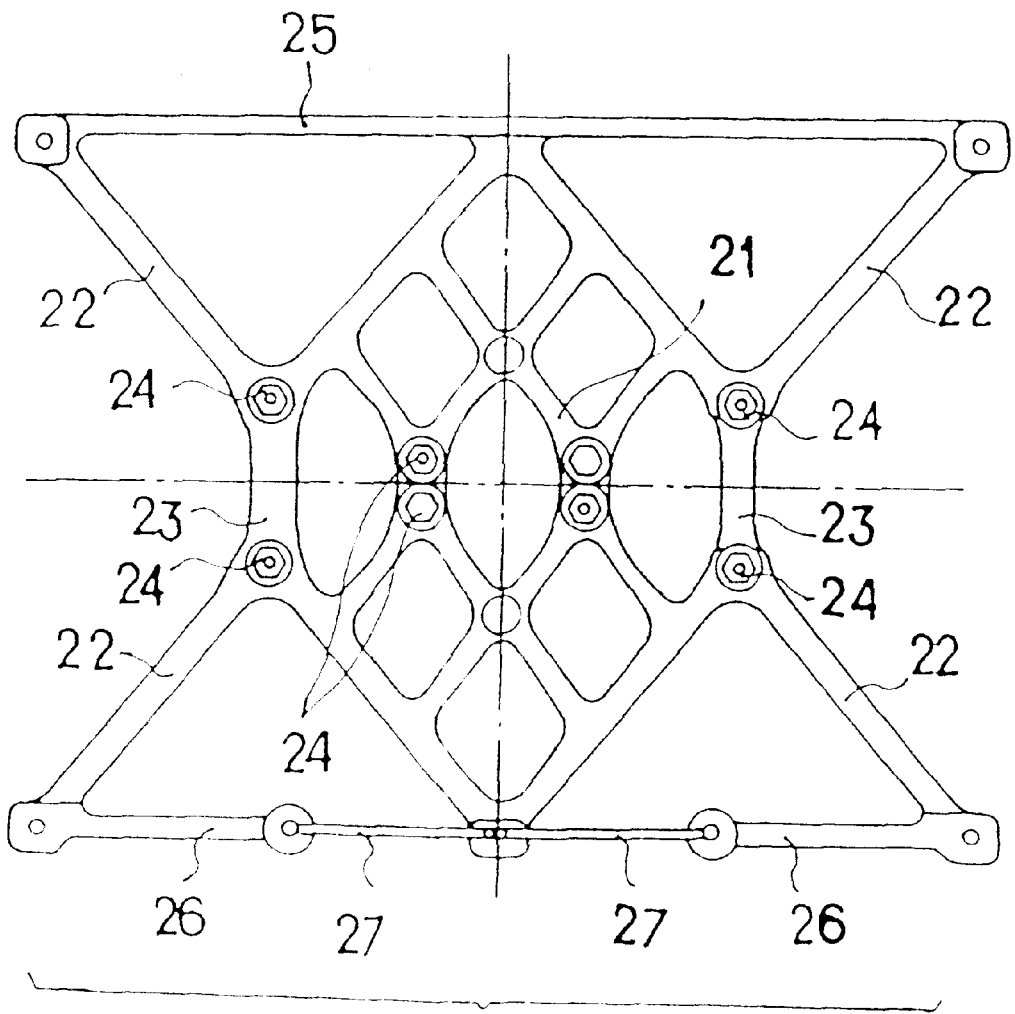
FIG. 3 is an enlarged view of a portion of the anti-skid device for vehicle tires.

FIG. 2 illustrates an anti-skid device for vehicle tires according to a preferred embodiment of the present invention. As shown, the anti-skid device for vehicle tires according to the present invention comprises an anti-skid body 10 composed of four flexible net treads 20 made of resin. The net tread 20 is provided with a net pattern at the intermediate portion and two pairs of slant arms 22. The upper portion of the net tread 20 has a transverse grip 23 which is shorter than the width of a tire (not shown). The transverse grip 23 preferably has a length equal to ½ to ⅔ of width of a tire.

Anti-skip members 24 are provided on appropriate positions of the net tread 20 so as to further increase the anti-skid ability of the anti-skid body 10.

The slant arms 22 extend outwardly from the transverse grip 23 of the anti-skid body 10. The slant arm 22 has a cross-section which is large enough to disperse centrifugal forces. The cross-section is generally circular in shape in order to withstand distortion. The outer end of each of the slant arms 22 is formed with a hole. A side arm 25 is mounted between the outer ends of the two slant arms 22 at the outer side of the tire.

An end arm 26 is connected at its one end with the outer end of the slant arm 22 and at its another end with a linking member 27. Then inner side with the end arms 26 and linking members 27 is slightly shorter than the outer side with the side arm 25 in length.

The four net treads 20 are connected together by five fixed hooks 28 and an openable hook 28A to form an elongated anti-skid body 10. The hook 28 is a closed member and cannot be opened, whereas the hook 28A is openable in structure. The hooks 28 and 28A may be of any conventional design well to those skilled in the art and are not considered a part of the invention.

The outer ends of the anti-skid body 10 are provided with hooks or easy locks (not shown) so that they can be connected together in use. When in use, a tire (not shown) is first enclosed with the anti-skid body 10 and then the outer ends of the anti-skid body 10 are joined together by hooks or easy locks (not shown). Furthermore, the outer side of the anti-skid body 10 is provided with an adjuster for tightening the anti-skid body on the tire.

Figure 4:
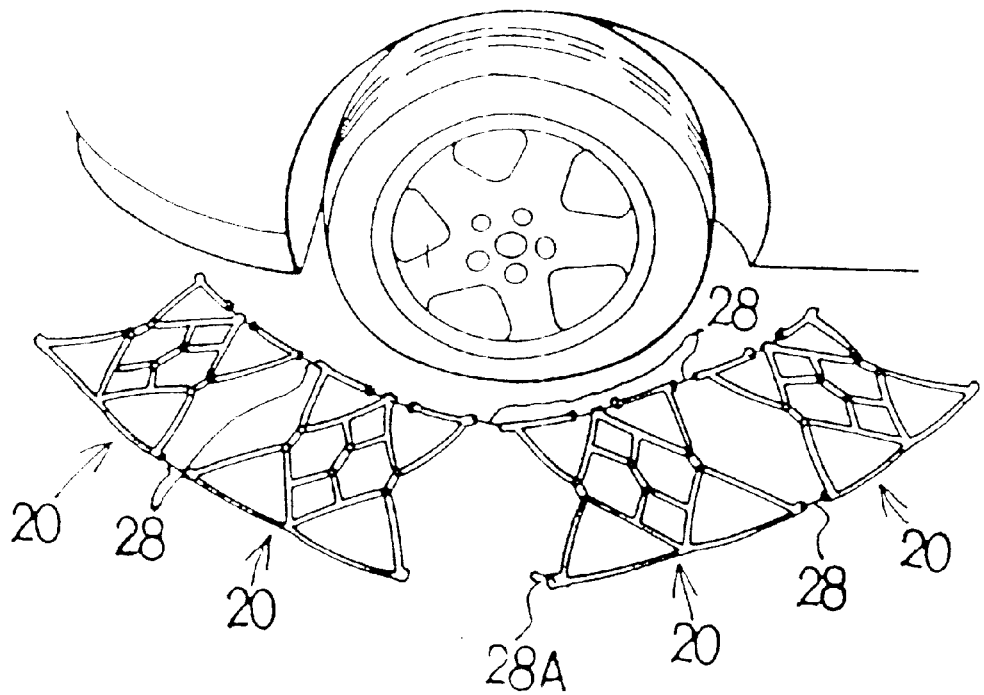
FIG. 4 illustrates the open condition of the anti-skid device for vehicle tires.
Figure 5:
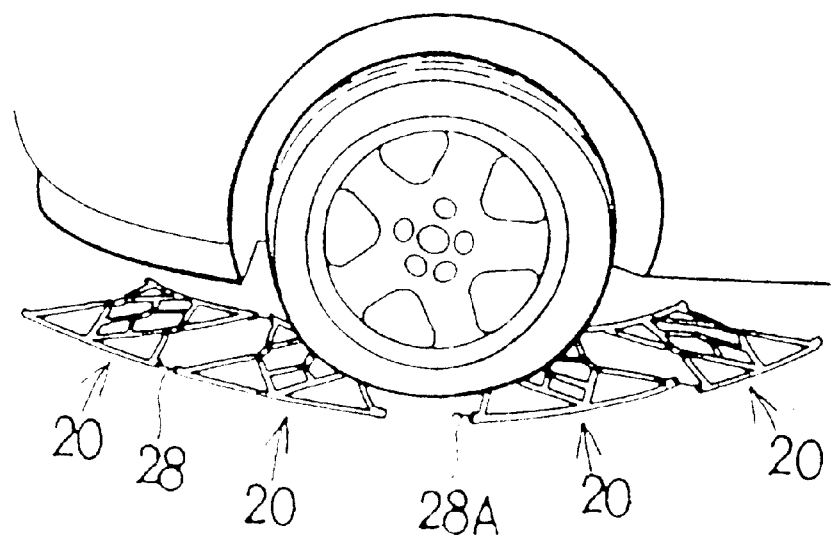
FIG. 5 illustrates how to install the anti-skid device on a tire.

Referring to FIG. 4, when in use, the anti-skid body 10 is first opened and then the hook 28A is unlocked. Thereafter, the anti-skid body 10 is placed under the tire (see FIG. 5) and the hook 28A is locked to form an elongated anti-skid body 10. Finally, the anti-skid body 10 is covered on the tire and then the outer ends of the slant arms 22 are joined together to form a ring-shaped member to enclose the tire.

Figure 6:
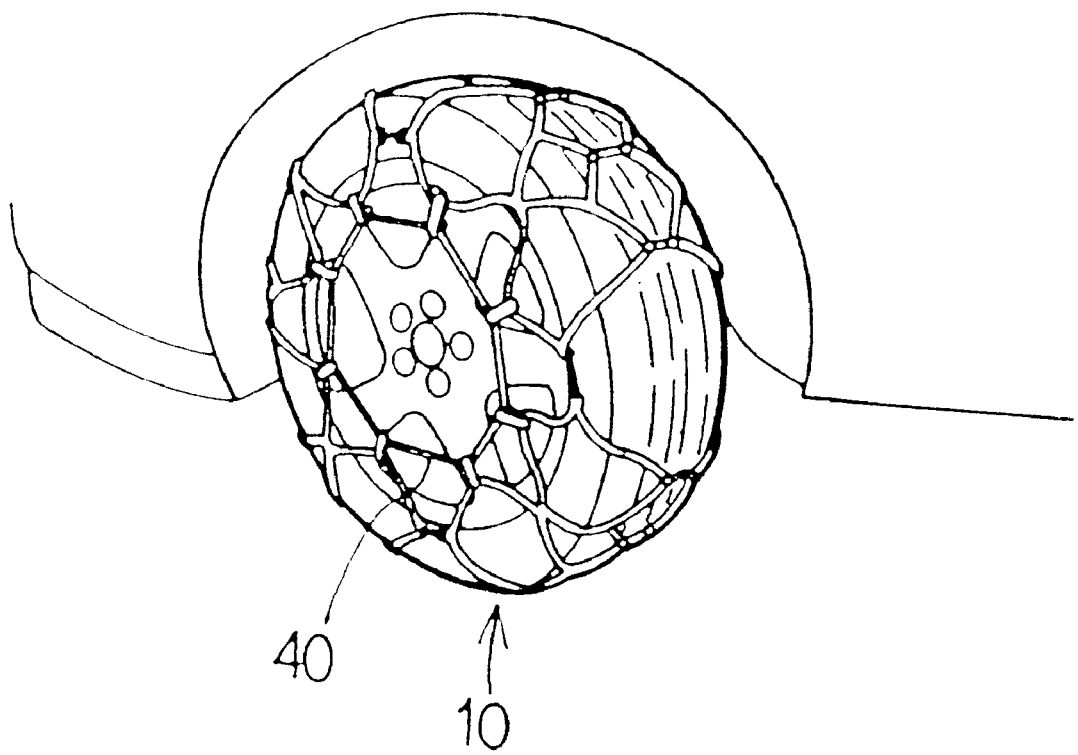
FIG. 6 is a working view of the present invention.

After the anti-skid body 10 is arranged on the tire, a plurality of binding members 40 are mounted to the anti-skid body 10 to tighten the anti-skid body 10 on the tire, as shown in FIG. 6.

Figure 7:
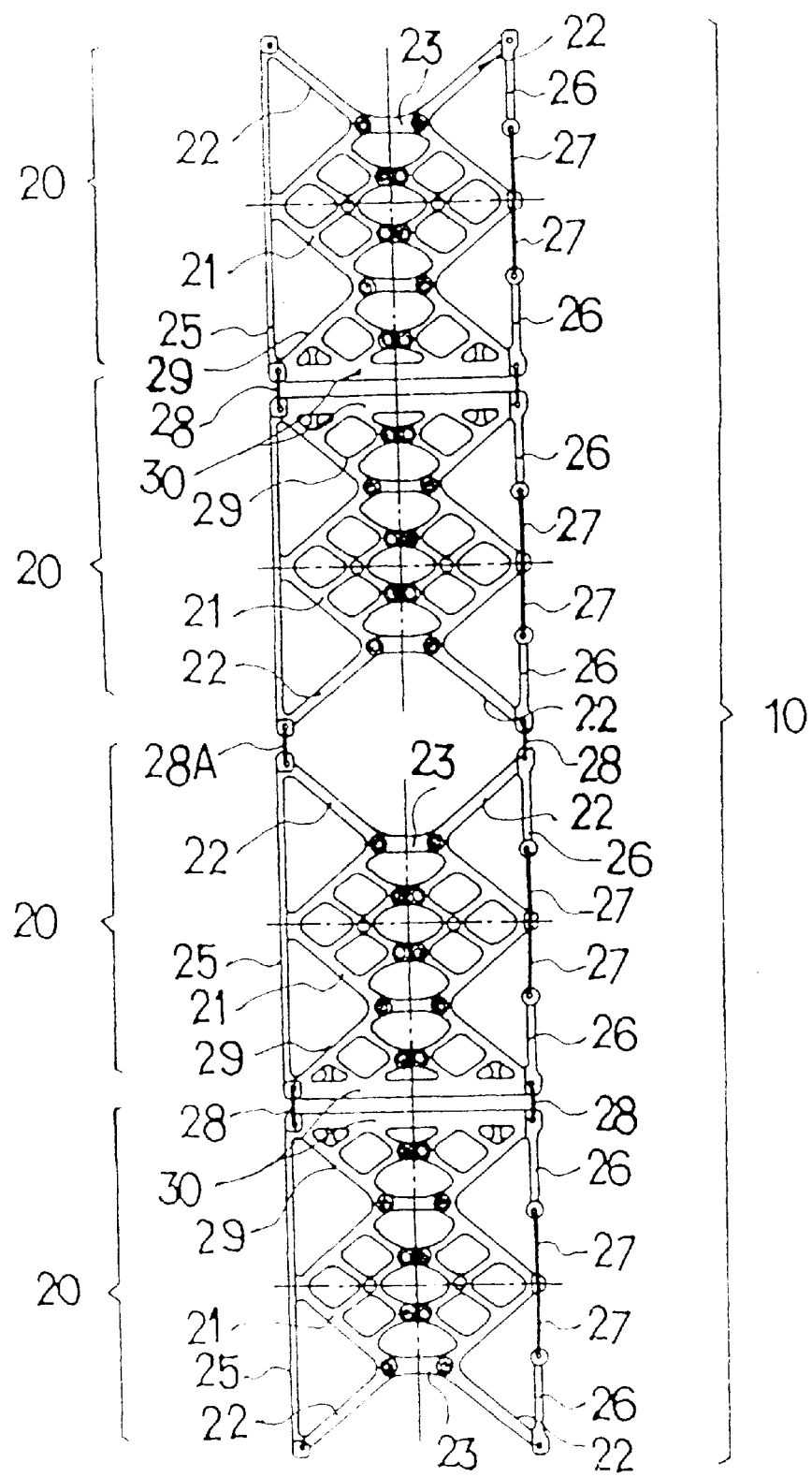
FIG. 7 illustrates a second preferred embodiment of the present invention.
Figure 8:
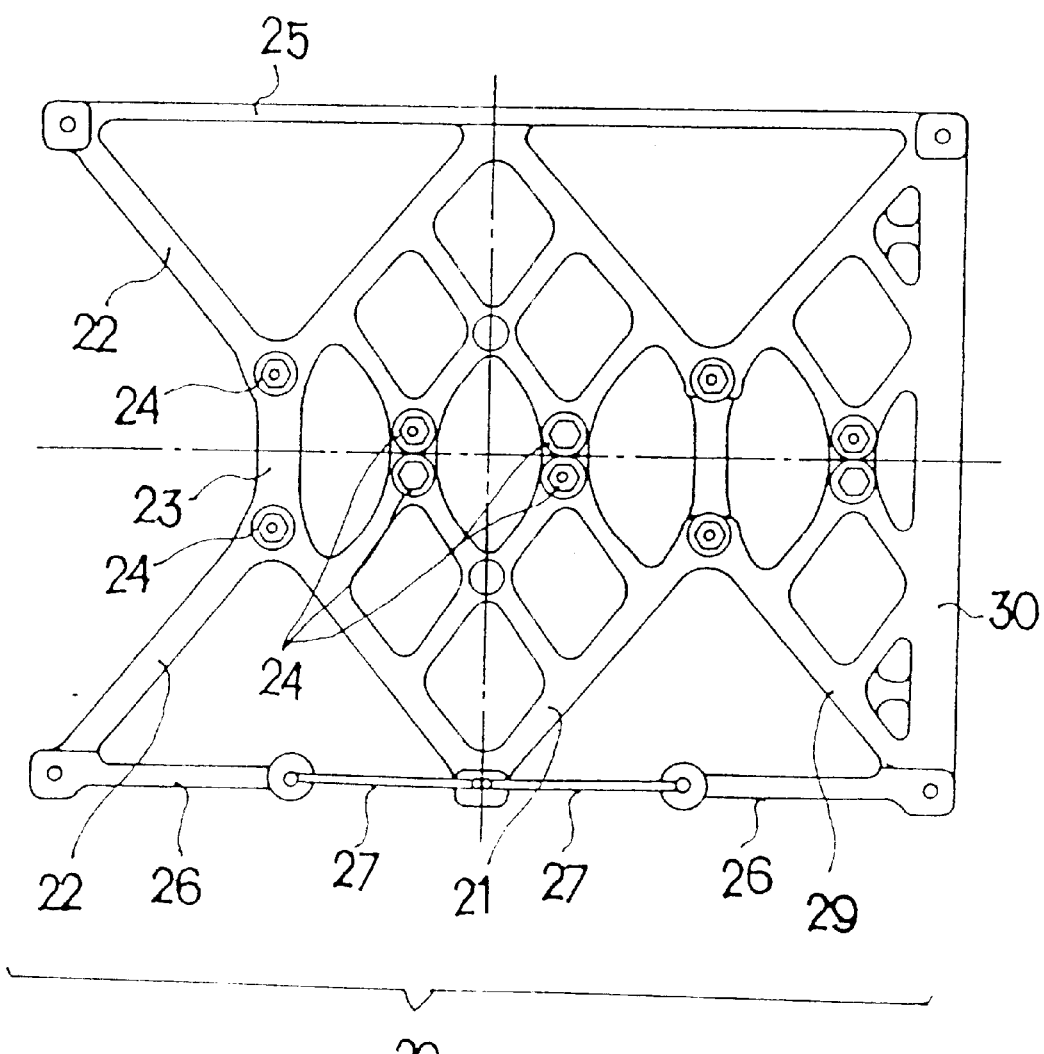
FIG. 8 is an enlarged view of the net tread according to the second preferred embodiment of the present invention.

FIGS. 7 and 8 illustrate another preferred embodiment of the present invention. As shown, each net tread 20 is provided with two slant arms 22 at its one side and a half-net pattern 29 at its the other side. The distance between two ends is just the same as the width of the anti-skid body, i.e. the length of the transverse grip 30. In short, a pair of slant arms 22 are provided at one side of the net tread 20, while a half-net pattern 29 at another side of the net tread 20.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An anti-skid device for vehicle tires comprising:

a plurality of flexible net treads connected together by linking members, each of said net treads having an intermediate portion being provided with a net pattern at an intermediate portion and at least one pair of slant arms, a portion of each of said net treads having a transverse grip which is shorter than the width of a tire and is disposed between the at least one pair slants arm;

anti-skid members being provided on positions of said net treads so as to further increase anti-skid ability of said anti-skid body;

side arms mounted between outer ends of said slant arms;

end arms connected with inner ends of said slant arm;

linking members connecting said end arms to said net treads;

said slant arms extending outwardly from said transverse grip, the distance between the outer ends of said slant arms being equal to the largest width of said anti-skid body;

said transverse grip of said net pattern having a length equal to $\frac{1}{2}$ to $\frac{2}{3}$ of width of said tire.

* * * * *